US009584451B2

(12) United States Patent
Adams et al.

(10) Patent No.: US 9,584,451 B2
(45) Date of Patent: Feb. 28, 2017

(54) SYSTEM, METHOD AND APPARATUS FOR OPTIMIZING WIRELESS COMMUNICATIONS OF SECURE E-MAIL MESSAGES WITH ATTACHMENTS

(75) Inventors: Neil Patrick Adams, Waterloo (CA); Ravi Singh, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/454,218

(22) Filed: Apr. 24, 2012

(65) Prior Publication Data

US 2013/0283054 A1    Oct. 24, 2013

(51) Int. Cl.
*H04L 12/58* (2006.01)
*H04W 12/02* (2009.01)
*H04W 12/10* (2009.01)
*H04L 29/06* (2006.01)

(52) U.S. Cl.
CPC ............ *H04L 51/08* (2013.01); *H04W 12/02* (2013.01); *H04W 12/10* (2013.01); *H04L 51/066* (2013.01); *H04L 63/0442* (2013.01); *H04L 63/126* (2013.01)

(58) Field of Classification Search
CPC ....... H04L 51/06; H04L 51/18; H04L 51/066; H04L 51/08; H04L 63/0884; H04L 12/583; H04L 12/5895; H04L 51/063; H04L 51/38; H04L 63/0428; H04L 63/0464; H04L 63/08; H04L 63/0823; H04L 63/12; H04L 63/123
USPC .......................................... 713/176; 709/206
See application file for complete search history.

(56) References Cited

U.S. PATENT DOCUMENTS

| 6,904,521 | B1 * | 6/2005 | Jivsov | H04L 12/5875 |
| | | | | 713/155 |
| 7,054,905 | B1 * | 5/2006 | Hanna et al. | 709/206 |
| 8,601,063 | B2 * | 12/2013 | Sylthe | G06Q 10/107 |
| | | | | 455/466 |
| 2002/0016818 | A1 * | 2/2002 | Kirani | G06F 17/30902 |
| | | | | 709/203 |
| 2002/0035687 | A1 * | 3/2002 | Skantze | H04L 9/0825 |
| | | | | 713/168 |
| 2003/0055907 | A1 * | 3/2003 | Stiers | 709/206 |
| 2003/0093565 | A1 * | 5/2003 | Berger et al. | 709/246 |

(Continued)

FOREIGN PATENT DOCUMENTS

| EP | 1806683 A1 | 7/2007 |
| EP | 2034687 A1 | 3/2009 |

OTHER PUBLICATIONS

Extended European Search Report dated Sep. 17, 2012 corresponding to European Patent Application numer 12165286.1.

(Continued)

*Primary Examiner* — Gary Gracia
(74) *Attorney, Agent, or Firm* — Moffat & Co.

(57) ABSTRACT

A system, method and apparatus are provided for secure e-mail message attachment optimization. Content attached to e-mail messages may not be suited to the resource constraints of the destination wireless device. In secure e-mail messages, the message may be signed and/or encrypted. A wireless server can determine resource parameters associated with a destination wireless device, such as display resolution, memory capacity, processor speed, and wireless interface constraints and re-scale the attached content to be optimized for delivery and presentation on the wireless device.

26 Claims, 8 Drawing Sheets

(56) References Cited

U.S. PATENT DOCUMENTS

| | | | |
|---|---|---|---|
| 2003/0154371 A1* | 8/2003 | Filipi-Martin | H04L 12/58 713/153 |
| 2003/0208546 A1* | 11/2003 | DeSalvo | H04L 12/583 709/206 |
| 2005/0071508 A1* | 3/2005 | Brown et al. | 709/246 |
| 2005/0114652 A1* | 5/2005 | Swedor | H04L 12/58 713/156 |
| 2005/0163320 A1* | 7/2005 | Brown | G06Q 10/107 380/270 |
| 2006/0039478 A1* | 2/2006 | Nonaka | H04N 7/17318 375/240.23 |
| 2006/0056604 A1* | 3/2006 | Sylthe | H04L 67/04 379/100.13 |
| 2007/0016690 A1* | 1/2007 | Fishman | G06F 17/30905 709/244 |
| 2007/0061576 A1* | 3/2007 | Takada | H04L 9/3263 713/175 |
| 2007/0233791 A1* | 10/2007 | Sylthe | G06Q 10/107 709/206 |
| 2007/0255792 A1* | 11/2007 | Gronberg | H04L 12/5835 709/206 |
| 2007/0269041 A1* | 11/2007 | Bhatnagar | H04L 12/58 380/30 |
| 2009/0280744 A1* | 11/2009 | Brown | H04W 8/005 455/41.2 |
| 2010/0011077 A1* | 1/2010 | Shkolnikov | H04L 12/583 709/206 |
| 2010/0124333 A1* | 5/2010 | Godfrey | G06Q 10/107 380/270 |
| 2011/0040978 A1* | 2/2011 | Tsao | G06Q 10/107 713/181 |
| 2011/0066687 A1* | 3/2011 | Chen | H04L 12/5835 709/206 |
| 2011/0145351 A1* | 6/2011 | Lee | G06F 3/1206 709/206 |
| 2011/0195690 A1* | 8/2011 | Brown | H04L 51/38 455/411 |
| 2011/0231646 A1* | 9/2011 | Brown | G06Q 10/107 713/150 |
| 2011/0252102 A1* | 10/2011 | Kim | G06F 1/32 709/206 |
| 2012/0110097 A1* | 5/2012 | Singh et al. | 709/206 |
| 2012/0166567 A1* | 6/2012 | Halahmi | H04L 65/4069 709/206 |
| 2012/0278620 A1* | 11/2012 | Singh et al. | 713/168 |
| 2013/0166915 A1* | 6/2013 | Desai | H04L 9/3247 713/176 |

OTHER PUBLICATIONS

Canadian Intellectual Property Office, Office Action on Application No. 2,813,992, Issued on Jul. 8, 2015.

* cited by examiner

SYSTEM, METHOD AND APPARATUS FOR OPTIMIZING WIRELESS COMMUNICATIONS OF SECURE E-MAIL MESSAGES WITH ATTACHMENTS

TECHNICAL FIELD

The present disclosure relates to electronic mail (e-mail) messages and in particular to sending secure electronic e-mail message to a wireless device containing attachments.

BACKGROUND

When e-mail messages are sent to wireless devices, or portable electronic devices, they can contain attachments providing content such as images, audio, video or documents. The content may be formatted in a manner that exceeds the capability of the wireless device or an access technology to the wireless device. For example an image may be in a resolution that exceeds the display resolution of the wireless device. Sending the original content, such as the image, to the wireless device may be a waste of resources as the additional size, or resolution may not be of benefit to the wireless device. When secure e-mail messages are sent to the wireless device, either by being signed, encrypted, or signed and encrypted with attached content, the content integrity must be maintained to ensure proper decryption and verification of the secure e-mail message.

Therefore, there is a need for an improved system and method for sending secure e-mail messages containing attached content optimized to a wireless device's capabilities.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
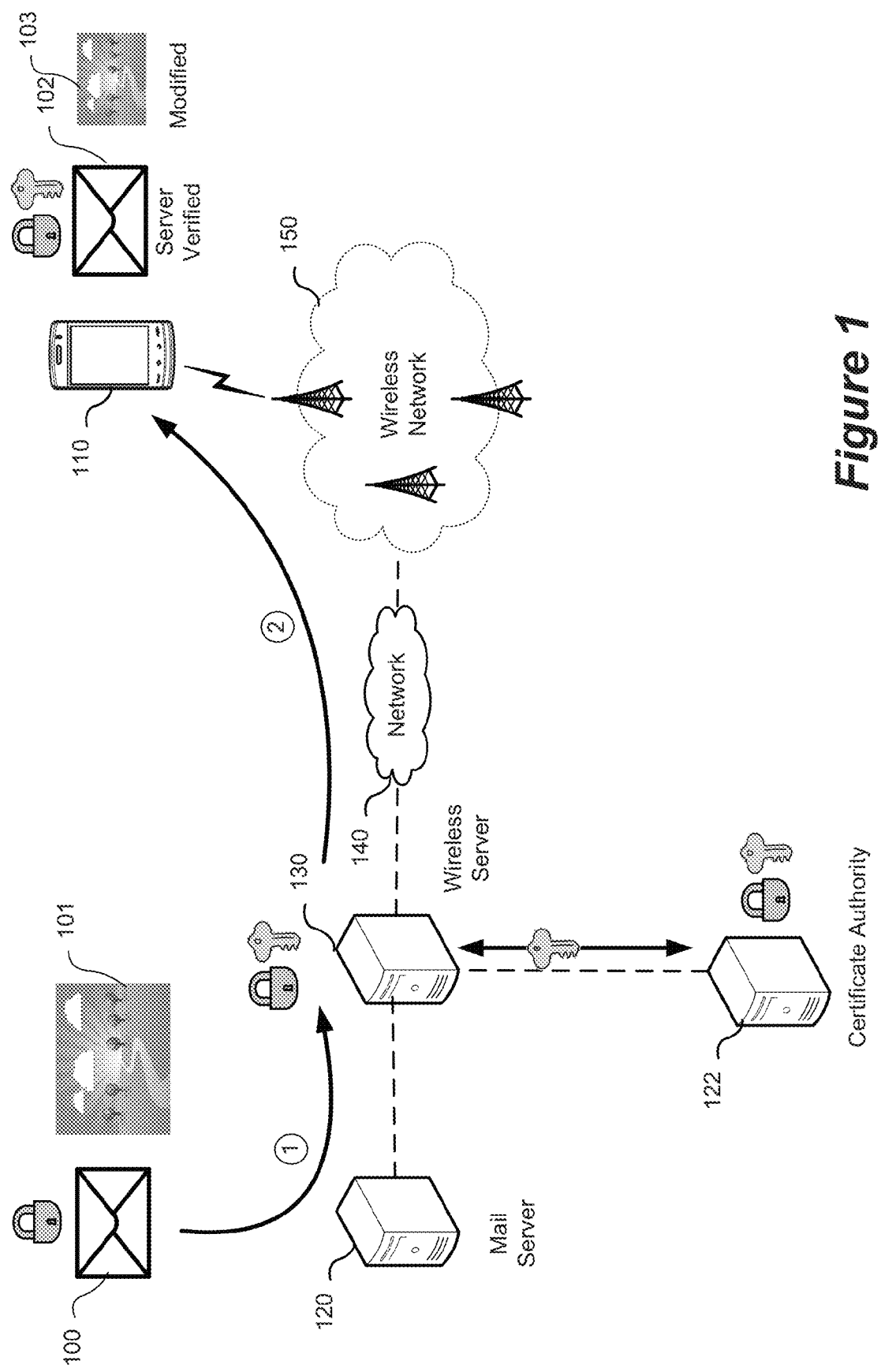
FIG. 1 shows a representation of attached content optimization for a signed secure e-mail message.

Embodiments are described below, by way of example only, with reference to FIGS. 1-8. Other aspects of the present disclosure will be apparent to those of ordinary skill in the art from a review of the following detailed description in conjunction with the drawings. Embodiments of the present disclosure are not limited to any particular operating system, mobile device architecture, server architecture, or computer programming language.

In accordance with an aspect of the present disclosure there is provided a server that processes e-mail messages for delivery to wireless devices, the server comprising: a component configured for receiving a secure e-mail message directed to a wireless device; a component configured for determining a resource parameter associated with the wireless device; a component configured for re-scaling content attached to the secure e-mail message based upon the determined resource parameter; and a component configured for sending the re-scaled content to the wireless device.

In accordance with another aspect of the present disclosure there is also provided a method configured to execute on a server, the method comprising: receiving a secure e-mail message directed to a wireless device; determining a resource parameter associated with the wireless device; re-scaling attached content of the secure e-mail message based upon the determined resource parameter; and sending the re-scaled content to the wireless device.

In accordance with yet another aspect of the present disclosure there is provided a computer readable memory containing instructions for e-mail message attachment optimization, the instructions which when executed by a processor perform the method comprising: receiving a secure e-mail message directed to a wireless device; determining a resource parameter associated with the wireless device; re-scaling attached content of the secure e-mail message based upon the determined resource parameter; and sending the re-scaled content to the wireless device.

In accordance with still yet another aspect of the present disclosure there is provided a wireless device comprising: a memory containing instructions; a processor for executing the instructions contained in the memory, the instructions for performing: receiving an encrypted secure e-mail message from a server coupled to a wireless network; decrypting the secure e-mail message; determining if attached content is associated with the encrypted secure e-mail message; sending a session key extracted from the encrypted secure e-mail message to the server; and receiving the attached content from the server wherein the attached content is re-scaled by the server based upon a resource parameter of the wireless device.

In accordance with still yet another aspect of the present disclosure there is provided a method configured to execute on a wireless device, the method comprising: receiving an encrypted secure e-mail message from a server coupled to a wireless network; decrypting the secure e-mail message; determining if attached content is associated with the encrypted secure e-mail message; sending a session key extracted from the encrypted secure e-mail message to the server; and receiving the attached content from the server wherein the attached content is re-scaled by the server based upon a resource parameter of the wireless device.

In accordance with still yet another aspect of the present disclosure there is provided a computer readable memory containing instructions for e-mail message attachment optimization, the instruction when executed by a processor perform the method comprising: receiving an encrypted secure e-mail message from a server coupled to a wireless network; decrypting the secure e-mail message; determining if attached content is associated with the encrypted secure e-mail message; sending a session key extracted from the encrypted secure e-mail message to the server; and receiving the attached content from the server wherein the attached content is re-scaled by the server based upon a resource parameter of the wireless device.

FIG. 1 shows a representation of attached content optimization for a signed secure e-mail message. An e-mail message 100 has attached image content 101 which is delivered to a mail server 120 (1) and is identified to a wireless server 130. The attached content (or may be referred to as an attachment) may be any file type such as media files, documents, executable files, or compressed files that are supported for embedding in the e-mail message. The e-mail message may use the standard representation known as Multipurpose Internet Mail Extensions (MIME) protocol which is an Internet standard that extends the format of e-mail message. MIME supports text in character sets other than ASCII, non-text attachments, message bodies with multiple parts, and header information in non-ASCII character sets. A secure e-mail message utilizes a security layer such as S/MIME (Secure/Multipurpose Internet Mail Extensions) protocol which is a standard for public key encryption and signing of MIME data. In this example the e-mail message is a signed secure e-mail message such as provided by S/MIME. In a signed secure e-mail message 100 the sender has added an encrypted signature to the message which can be used to authenticate the identity of the sender of the e-mail message. The receiver of the secure e-mail message 100, wireless device 110, can download a public key associated with the sender and verify the credentials to verify the origins of the secure e-mail message 100. The body of the e-mail message 100 or attachments are not necessarily encrypted in a signed secure e-mail message and can be inspected by the wireless server 130.

The wireless server 130 receives the messages 100 from the mail server 120 and scans the e-mail message 100 for attached content 101. If the attached content 101 can be optimized by re-scaling or reformatting, the wireless server 130 will verify the signature of the sender by retrieving a sender certificate from a certificate authority 122 or a key stored locally or network accessible. The attached content 101 can then be re-scaled based upon resource parameters of the wireless device, such as display size, memory capacity, wireless resources, and processing power. The parameters may be previously determined and stored at the wireless server 130, may be retrieved from a configuration server, or a query may be performed from the wireless server 130 to the target wireless device 110 to determine device resources or limitations. Once the attached content 101 is modified 103, the receiving device 110 can not perform verification of the e-mail message 103 as the package of the original secure e-mail message 100 will no longer be consistent with the signature. The wireless server 130 must therefore perform verification of the secure e-mail message 102 and the modified attached content 103. The e-mail message header, a custom field or a standard field, is marked as being verified by the server 130 and that content 103 has been modified, and therefore is not the original attached content. The modified e-mail message 102 and attached content 103 is then forwarded (2) to the wireless device 110 through an intermediary network 140, or directly to the wireless network 150 if the wireless server 130 resides in the wireless server provider infrastructure. The e-mail message 102 is displayed on the device 110 with an indication that the message has been server verified and that the content 103 has been modified. The wireless device 110 can then extract the modified image 103 for display. In present representation the wireless server 130 and mail server 120 are depicted as being separate entities, however, they may be a single server and reside on the same device and/or be incorporated or integrated into the same application as required, however for simplicity the term wireless sever is used throughout the disclosure. It should be noted that recipients of the e-mail message 100 may not necessarily be coupled to the wireless network 150 but can be any device capable of receiving an e-mail message.

In the case of encrypted secure e-mail messages, the wireless server 130 typically is unable to decrypt the contents of the message to scan for the attachment headers as it does not have appropriate decryption keys as only the receiver is able to decrypt any messages. In certain scenarios the decryption key may be available to the wireless server 130, such as for malware scanning, however this may only be used for network level encryption, rather than end-user encryption. In wireless e-mail delivery systems the e-mail message may be delivered in portions to the device on an as needed basis.

In an encrypted secure e-mail message scenario, as the wireless device must perform the decryption of the header of the e-mail message to retrieve session keys, the wireless server cannot directly modify the attached content before the message is sent to the wireless device. However, in the LEMONADE e-mail message profile, enhancements to Internet e-mail messages to Support Diverse Service Environments, defined by the Internet Engineering Task Force (IETF) in RFC 2550, e-mail messages may be sent to a mobile device without being downloaded to the mobile device to conserve bandwidth and device resources. The attachments may not be downloaded or viewed by the user unless the entire message is received by the wireless device. In order to enable optimization of the attachments, the wireless device can determine if attached content is present in the e-mail message as portions are downloaded, and before downloading the complete attachment request that the server optimize the attachments as described in FIG. 2.

Figure 2:
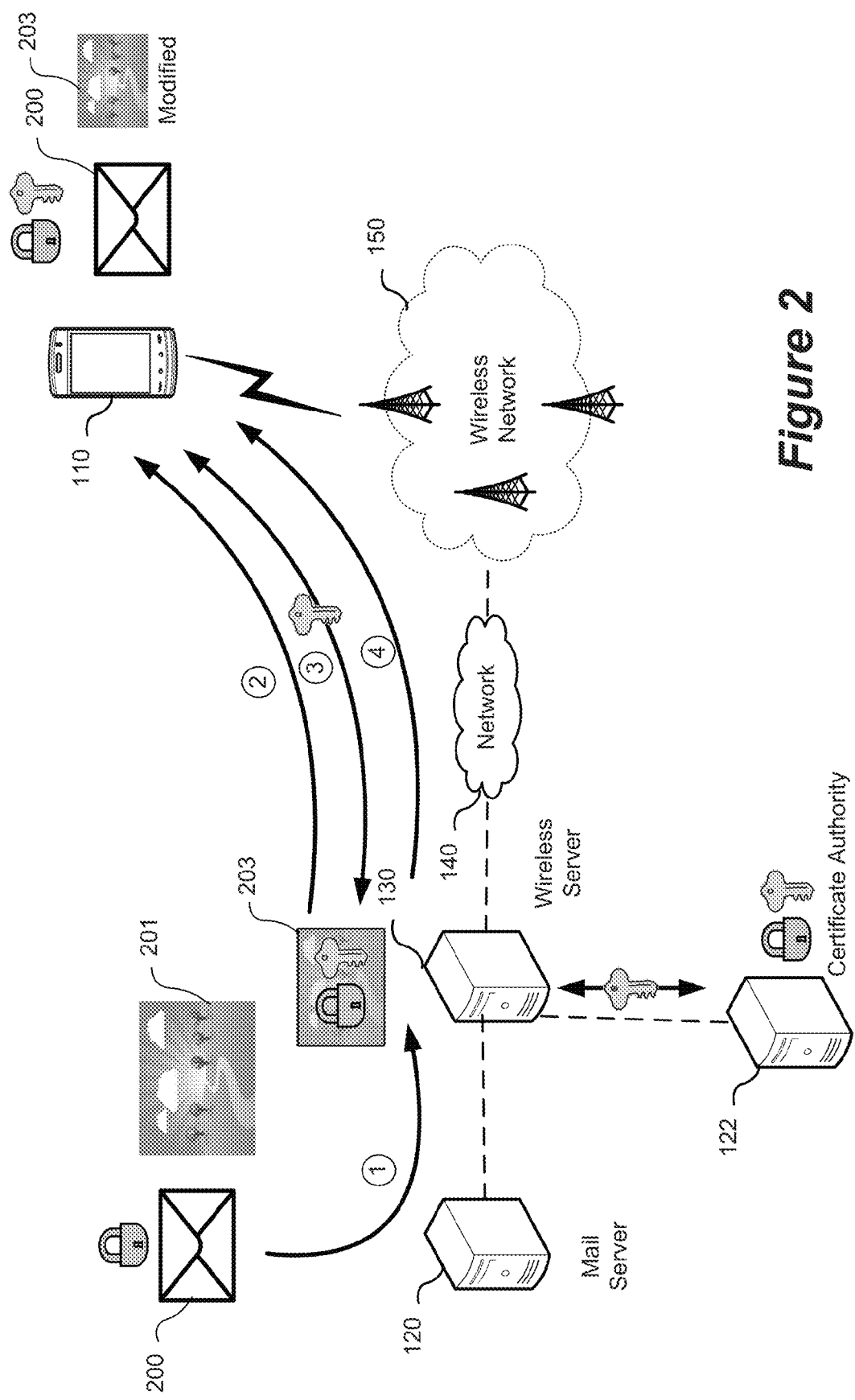
FIG. 2 shows a representation of attached content optimization of an encrypted secure e-mail message.

FIG. 2 shows a representation of attached content optimization of an encrypted secure e-mail message. The encrypted e-mail message 200 is provided (1) to the wireless server 130 from a mail server 120. For encrypted e-mail messages 200 content attachments, for example an image 201, are embedded within S/MIME body and are not available until the portion of the e-mail message containing the respective attachment is downloaded (2) to the wireless device 110. To enable optimization of the attachments the wireless device 110 uses a private key to decrypt the message header to retrieve the session key (3) which is sent to the wireless server when it identifies that additional portions of the e-mail message may contain content attachments. The wireless server can then use the session key to decrypt the attached content from the message body. In this manner the wireless device 110 only downloads the portions of the encrypted secure e-mail message 200 required to determine if content 201 is attached and can conserve resources by allowing the wireless server 130 to optimize the attached content 203 before downloading the rest of the message 200. The wireless device 110 may also retrieve a sender certificate from certificate authority 122 to verify the sender of the e-mail message during the decryption process.

As attachments are received in a serial manner based upon their position within the body text of the e-mail message, the wireless device 110 must therefore notify the wireless server 130 of the presence of attached content and provide the appropriate session decryption key. Once the wireless server 130 has the session key it can decrypt the attachments and determine if the content 201 of the attachment can be re-scaled to match or conserve resources on the wireless device 110. The re-scaled content 203 is then sent (4) to the wireless device 110 from the wireless server 130. The re-scaled content 203 may be re-encrypted using a public encryption key of the wireless device 110 or session based encryption if required before sending the attachments. The wireless device 110 would identify that the encrypted content was modified by the server however the security and/or signature was verified by the wireless device.

Figure 3:
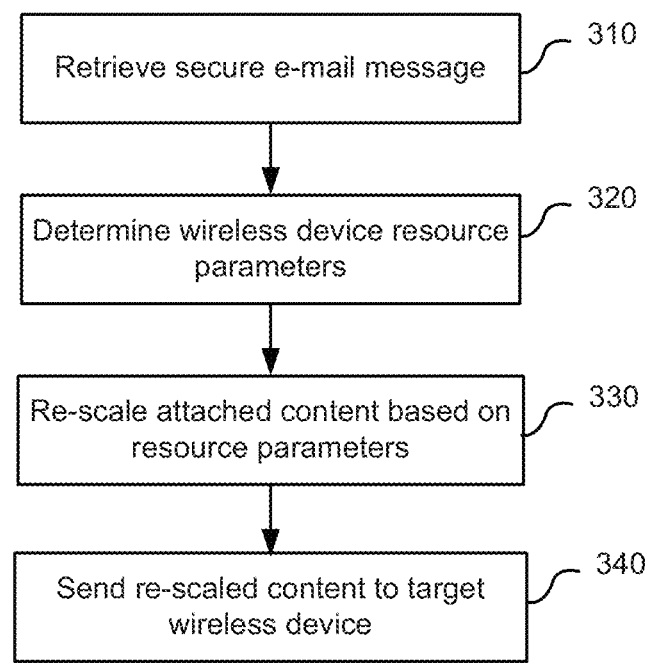
FIG. 3 shows a method of attached content optimization of a secure e-mail message.

FIG. 3 shows a method of attached content optimization of a secure e-mail message. The method starts by receiving a secure e-mail message at a wireless server (310) from a mail server either locally or connected through a network. The wireless server determines the resource parameters of the target wireless device of the e-mail message (320). The resource parameters may be retrieved from a database defining configuration or preferences associated with the wireless device or through a query mechanism with the wireless device, or selected by a user of the wireless device. The resource parameters may be defined by one or more constraints of the device such as display size, memory capacity, network interface capacity, or processor speed. The content attached to the e-mail message can then be re-scaled (330) to be optimized target wireless device to reduce the size of the attached content. The attached content is then sent to the wireless device (340).

Figure 4:
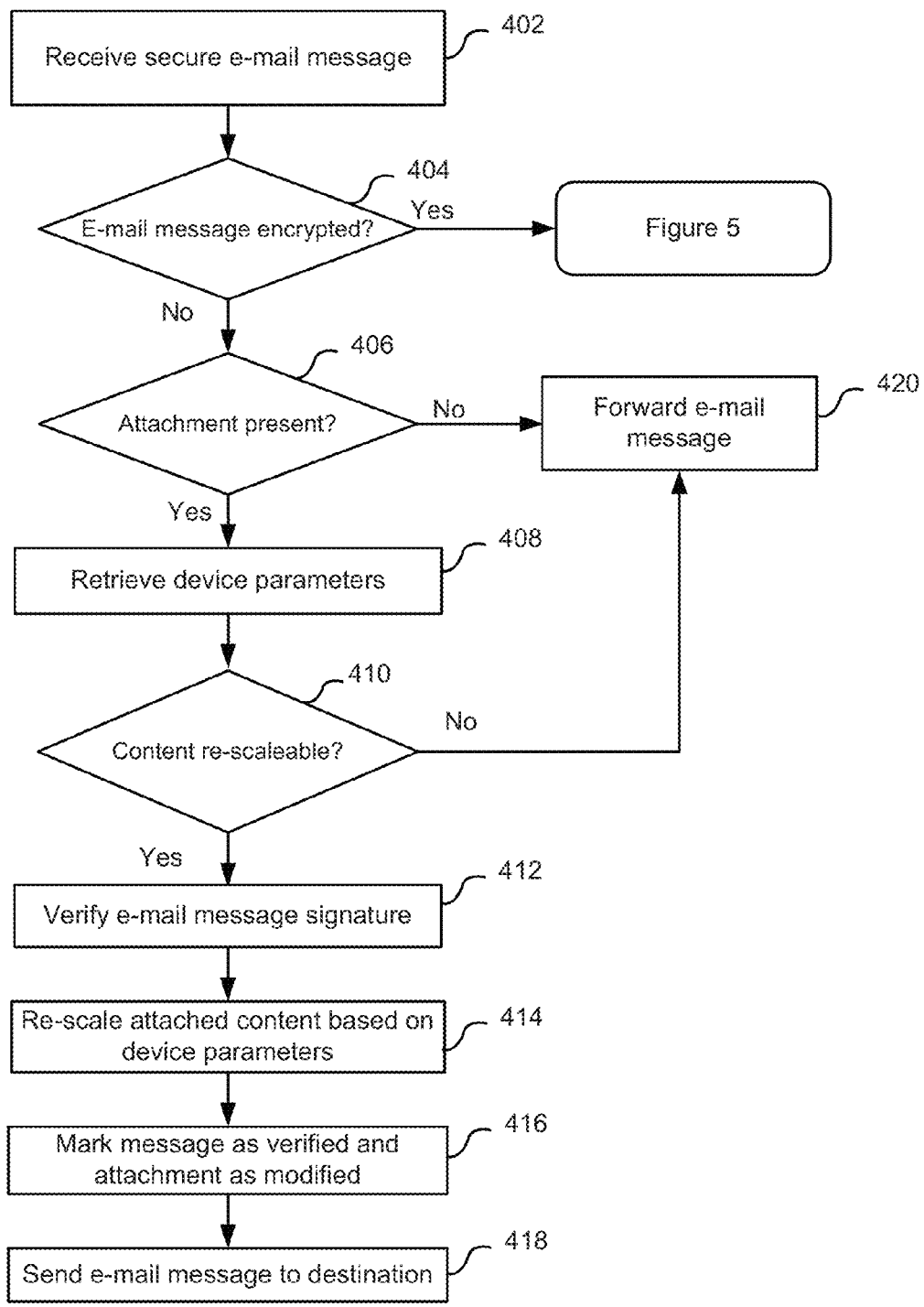
FIG. 4 shows a method of attached content optimization of a signed secure e-mail message.
Figure 5:
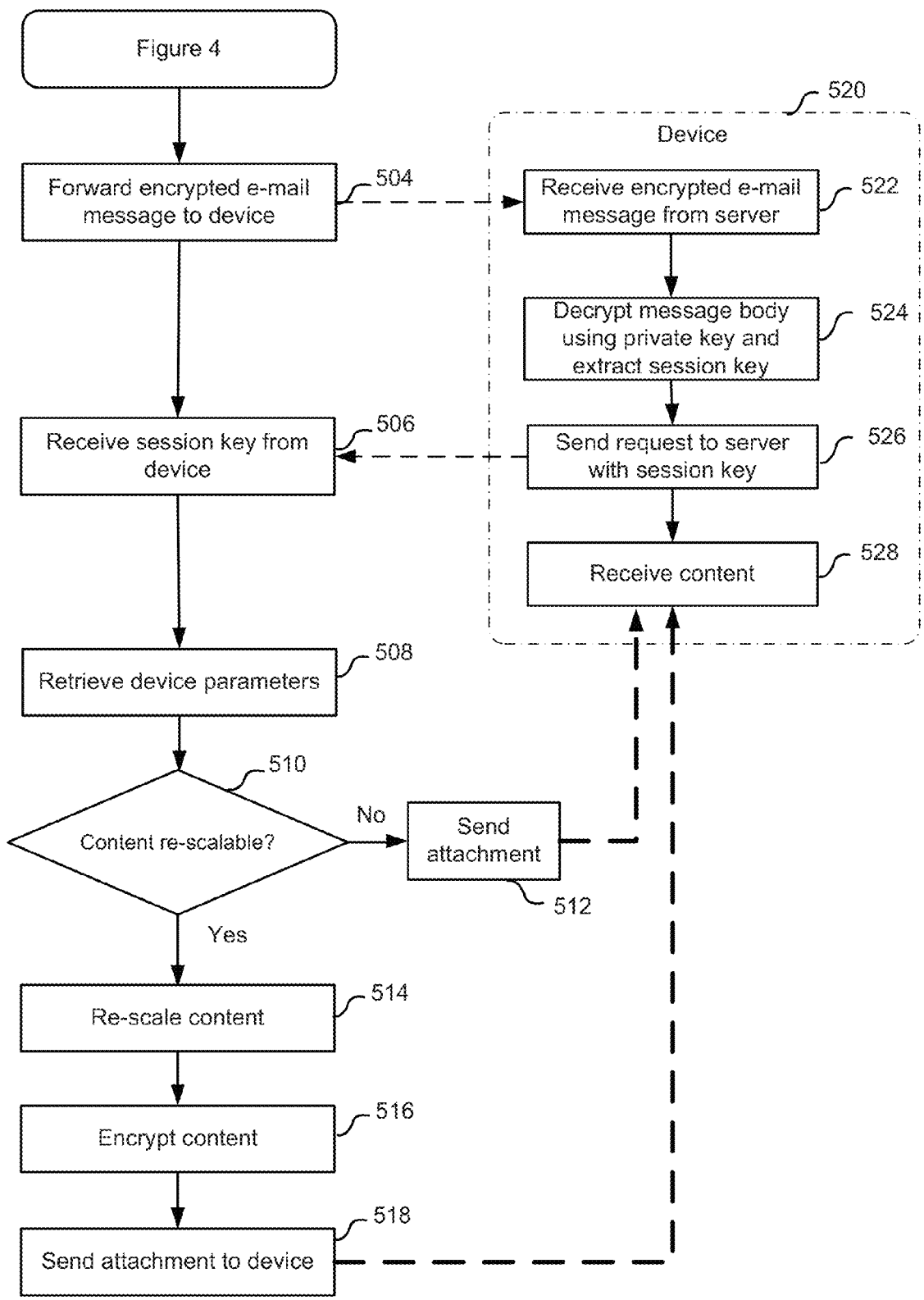
FIG. 5 shows a method of attached content optimization of an encrypted secure e-mail message.

FIG. 4 shows a method of attached content optimization of a signed secure e-mail message. The secure e-mail message is received at the wireless server (402). If the e-mail message is encrypted (YES at 404) the method continues as described in FIG. 5 presented in relation to an encrypted secure e-mail message. If the e-mail message is not encrypted (NO at 404) it is assumed, or previously determined, that the e-mail message is a signed secure e-mail message. It is then determined if the signed e-mail message contains attached content. If there is attached content (YES at 406), the resource parameters associated with the wireless device is determined (408). It is then determined if the content is re-scalable content (YES at 410) relative to the defined resource parameters, for example, does the content exceed the determined resource parameters of the wireless device but can be re-scaled based on known device resource parameters of the wireless device. The signature on the secure e-mail message is verified (412) by confirming the sender identity and the original content. The content is then re-scaled based upon the resource parameters (414). For example an image may be re-scaled to a lower resolution, a PDF may be optimized to reduce its file size, a video or audio file may be down-sampled or transcoded to another format to be optimized to the wireless device. The e-mail message is then marked as verified and the content as modified using a field in the e-mail header (416) before being sent to the destination wireless device (418). If the e-mail message does not contain attached content (NO at 406) or is not re-scalable (NO at 410) it will be forwarded directly to the wireless device (420) and not modified. However, the wireless server may verify the e-mail message if server side verification is required.

FIG. 5 shows a method of attachment optimization of an encrypted secure e-mail message. When an encrypted e-mail message is received at the wireless server it is forwarded directly to the wireless device (504). The message is sent in portions to the wireless device which executes a method flow 520. The wireless device (522) receives the header portion of the e-mail and decrypts the header using an associated private key and extracts a session key from the message (524). The wireless device may also verify a sender signature of the secure e-mail message or request that the server verify the sender. If the wireless device identifies that an attachment is present in the e-mail message, when it receives an attachment identifier in an associated downloaded portion, but has not received all the portions of the e-mail message, a request identifying the message is sent to the wireless server including the extracted session key (526). The request may also identify a portion identifier or attachment identifier so that the wireless server may locate the content to be optimized. The wireless server receives identification of the e-mail message from the wireless device that has attached content and a session key from the wireless device (506). The resource parameters associated with the wireless device are determined (508). If it is determined that the content is re-scalable content relative to the defined resource parameters (YES at 510), the content is re-scaled (514) to be optimized for the wireless device. The content may then be re-encrypted (516) and sent to the wireless device (518). The wireless device may identify that the content has been modified, and may provide the user with the ability to download the unmodified content if required. The encrypted content is then received by the wireless device (528) and added the e-mail message. If it was determined that the content is not re-scalable (NO at 510) the attached content is sent to the wireless device and is not modified (512).

Figure 6:
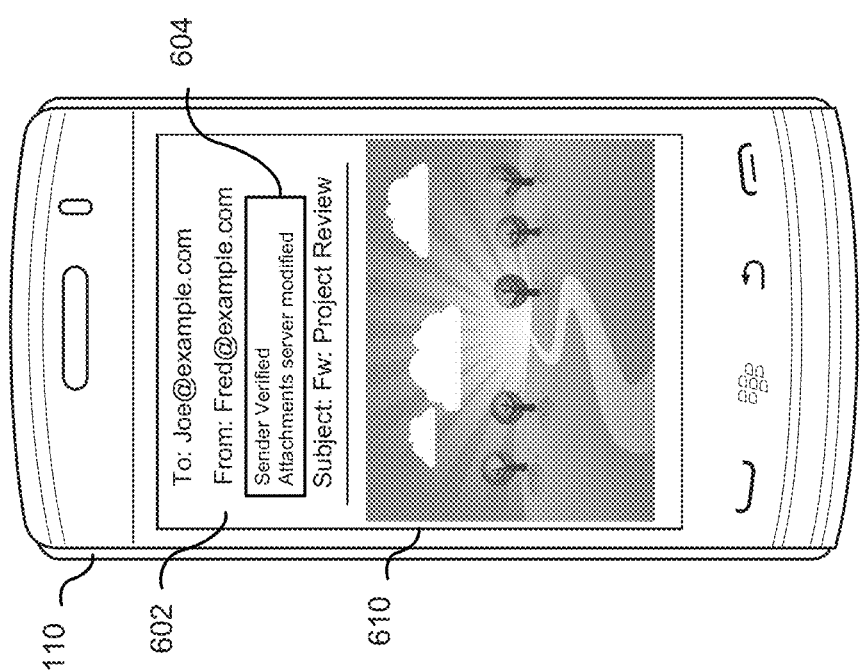
FIG. 6 shows a representation of a display on a wireless device for receiving the secure e-mail message and optimized attached content.

FIG. 6 shows a representation of a display on a wireless device 110 for receiving the secure e-mail message and optimized attachments. The presentation of the e-mail message 602 having optimized attached content 610 may provide an indicator 604 to identify to the user that the sender of the message has been verified by the wireless server and that attachments have been modified by the server. Similarly the indicator 604 may show that the secure e-mail message was encrypted and the verification was performed by the wireless device 110 and the attached content was modified by the server. The user may also be provided with an option to download the original attached content if necessary. During the process of retrieving a secure e-mail message the wireless device 110 may present the user with an option to request attached content optimization or by-pass optimization and download the attached content without modification.

Figure 7:
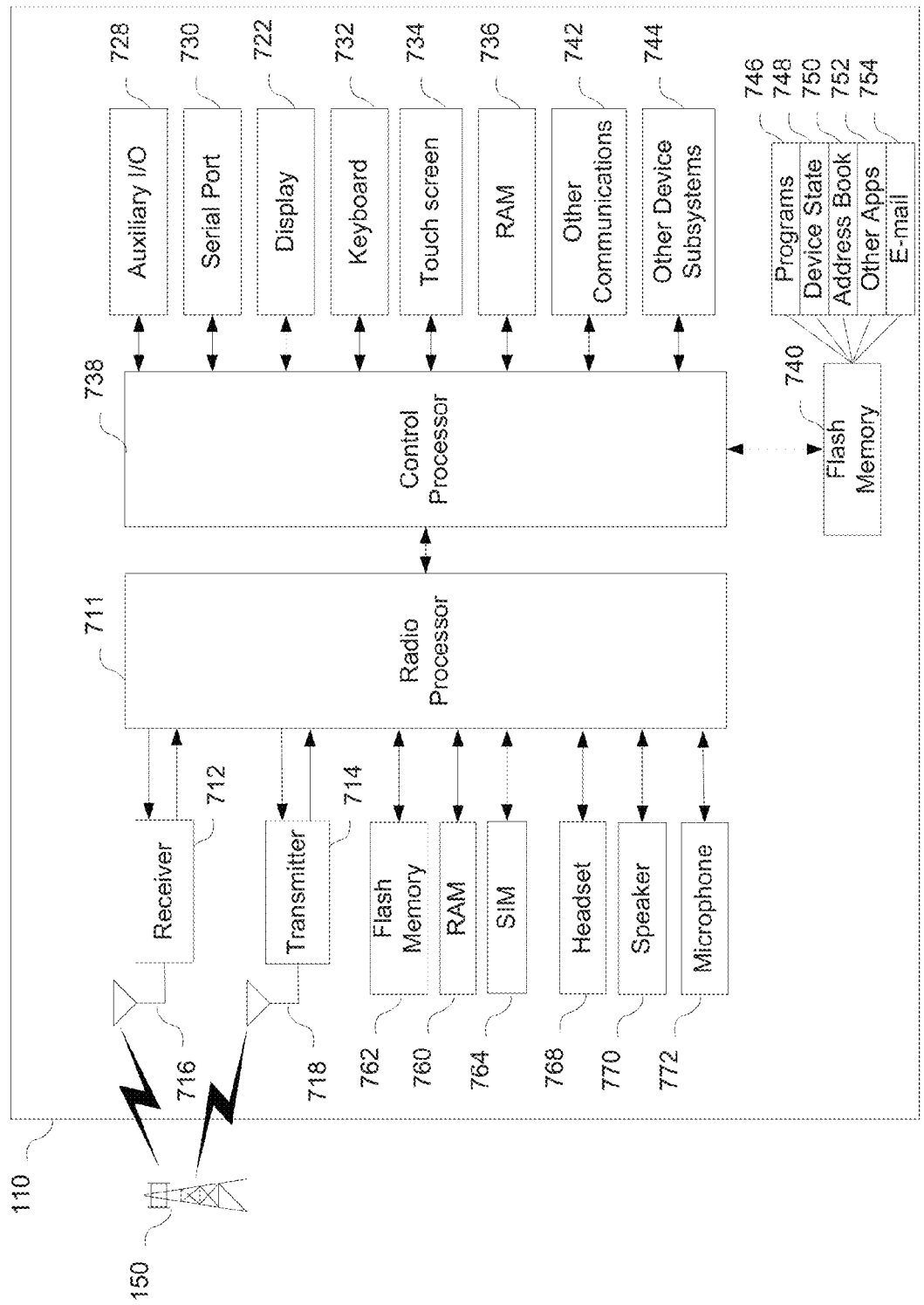
FIG. 7 shows a representation of a wireless device for receiving optimized attached content in a secure e-mail message.

FIG. 7 is a block diagram of a wireless device for replying/forwarding of e-mail, in particular a wireless device 110 is shown incorporating a communication subsystem having both a receiver 712 and a transmitter 714 as well as associated components such as one or more embedded or internal antenna elements 716 and 718. The particular design of the communication subsystem will be dependent upon the communication network in which the device is intended to operate.

When required network registration or activation procedures have been completed, wireless device 110 may send and receive communication signals over a wireless network 150. Signals received by antenna 716 are input to receiver 712, which may perform such common receiver functions as signal amplification, frequency down conversion, channel selection and the like. Radio processor 711 interacts with receiver 712 and transmitter 714, and further with flash memory 762, random access memory (RAM) 760, the subscriber identity module 764, a headset 768, a speaker 770, and a microphone 772.

Control processor 738 interacts with further device subsystems such as the display 722, flash memory 740, random access memory (RAM) 736, auxiliary input/output (I/O) subsystems 728, serial port 730, keyboard 732, input devices such as a touch-sensitive display or touch input device 734, other communications 742 and other device subsystems generally designated as 744.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list. Additionally certain components may be combined, for example, the keyboard 732 and the display 722 may be combined as a single component such as a touch-sensitive display.

Software used by radio processor 711 and control processor 738 is stored in a persistent store such as flash memory 740 and 762, which may instead be a read-only memory (ROM) or similar storage element (not shown). Those skilled in the art will appreciate that the operating system, specific device applications, or parts thereof, may be temporarily loaded into a volatile memory such as RAM 736 and RAM 760. Received communication signals may also be stored in RAM 736.

As shown, flash memory 740 can be segregated into different areas for computer programs 746, device state 748, address book 750, other applications 752 and e-mail programs 754. These different storage types indicate that each program can allocate a portion of flash memory 740 for their own data storage requirements. Microprocessor 738, in addition to its operating system functions, preferably enables execution of software applications on the wireless device For voice communications, overall operation of wireless device 110 is similar, except that received signals would preferably be output to the speaker 770 or headset 768 and signals for transmission would be generated by the microphone 772. Alternative voice or audio I/O subsystems, such as a voice message recording subsystem, may also be implemented on wireless device 110.

Other device subsystems 744, such as a short-range communications subsystem, is a further optional component which may provide for communication between wireless device 700 and different systems or devices, which need not necessarily be similar devices. For example, the subsystem 744 may include an infrared device and associated circuits and components or a Bluetooth™ communication module to provide for communication with similarly enabled systems and devices.

Figure 8:
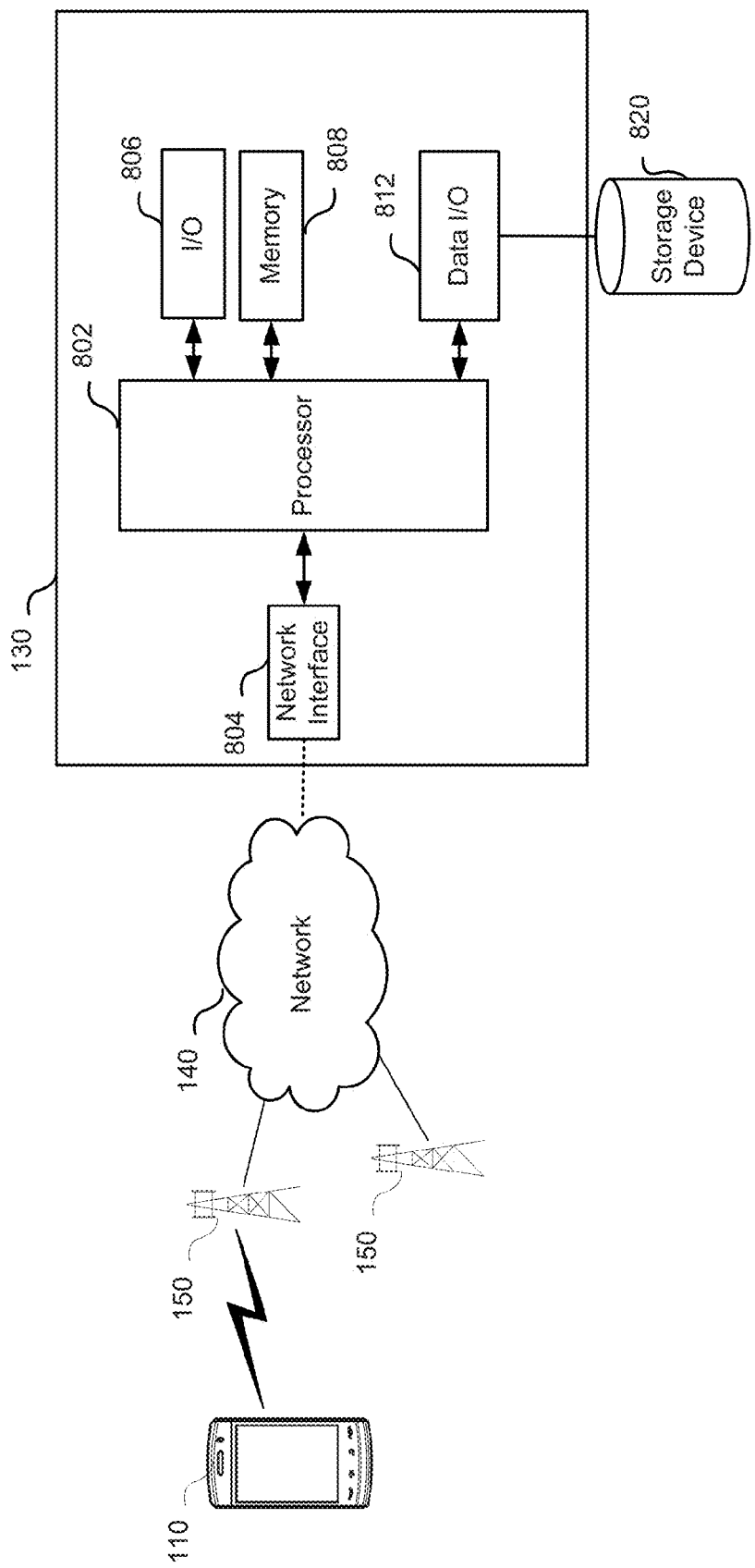
FIG. 8 shows a representation of a server for optimizing attached content of a secure e-mail message.

FIG. 8 shows a representation of a server for optimizing attachments of a secure e-mail message. The wireless server 130 may be a wireless server, a mail server, or a combination therein. The wireless server has one or more processors 802 coupled to a network interface 804. The server communicates with the wireless device 110 through a wireless network 150, which may be directly coupled or coupled indirectly through network 140. The processor has memory 808 for executing instructions for optimizing attached content and a data input/output interface 812 for retrieving instructions and stored device resource parameters in storage device 820, either directly coupled or remotely accessible. The wireless server 130 may include mail processing functions or be used in combination with a mail server 120 coupled to the network. The wireless server 130 may be controllable or configurable through an I/O interface 806 providing direct user input or remotely controllable. The wireless server 130 functions may be resident in a single function in a distributed computing environment which would cooperatively provide similar functions.

The system and methods according to the present disclosure may be implemented by any hardware, software or a combination of hardware and software having the above described functions. The software code, either in its entirety or a part thereof, may be stored in a computer-readable memory. Further, a computer data program representing the software code may be embodied on a computer-readable memory.

While particular embodiments of the present system and methods have been described herein, it will be appreciated by those skilled in the art that changes and modifications may be made thereto without departing from the disclosure in its broadest aspects and as set forth in the following claims.

The invention claimed is:

1. A server that processes e-mail messages for delivery to wireless devices, the server comprising:
   a processing device for executing instructions; and
   a memory device for storing instructions, which when executed by the processor unit configure the server to:
   receive from a sender a secure e-mail message directed to a recipient the secure e-mail message including at least one or more encrypted components that are encrypted with an encryption scheme between the sender and the recipient;
   determine whether the encrypted components include image attachments to be re-scaled;
   if the encrypted components include image attachments to be re-scaled, verify a signature of the sender by retrieving a sender certificate;
   forward a portion of the secure e-mail message to the recipient when decryption keys for the encryption scheme is unavailable to the server;
   receive from a wireless device of the recipient, a request to re-scale the image attachments, and the request including a session key extracted from the forwarded secure e-mail message;
   decrypt the at least the one or more encrypted components of the secure e-mail message using the session key received from the recipient wireless device;
   determine whether the image attachments may be re-scaled based on a resource parameter which specifies one or more constraints of the wireless device;
   re-scale in response to the determining the image attachments to accommodate the one or more constraints of the wireless device;
   re-encrypt the re-scaled image attachments:
   marking the secure e-mail to indicate the re-encrypted re-scaled image attachments being modified and verified by the server; and
   send the re-encrypted re-scaled image attachments and the marked secure e-mail to the wireless device.

2. The server of claim 1 wherein the mark is generated prior to sending the re-scaled image attachment in the e-mail message to the wireless device.

3. The server of claim 2, wherein the marking is embedded in the header of the modified e-mail message.

4. The server of claim 2 wherein the executed instructions configuring the server to send the re-scaled image attachment further configure the server to encrypt the re-scaled image attachment prior to sending it to the device.

5. The server of claim 1, wherein the resource parameter is selected from one or more resources of the wireless device selected from the group consisting of: a display resolution of the wireless device, a memory capacity of the wireless device, a wireless interface speed of the wireless device, and a processor speed of the wireless device.

6. The server of claim 1, wherein the resource parameter of the wireless device is determined from configuration data associated with the wireless device stored at the server or retrieved by the server.

7. The server of claim 1, wherein the secure e-mail message has an S/MIME signature and/or S/MIME encryption.

8. The server of claim 1, wherein the instructions when executed by the processor unit further configure the server to:
   store the image attachment prior to re-scaling;
   receive a request from the wireless device for the image attachment; and send the image attachment to the wireless device.

9. A method configured to execute on a server, the method comprising:
   receiving from a sender a secure e-mail message directed to a recipient the secure e-mail message including at least one or more encrypted components that are encrypted with an encryption scheme between the sender and the recipient;
   determining whether the encrypted components include image attachments to be re-scaled;
   if the encrypted components include image attachments to be re-scaled, verifying a signature of the sender by retrieving a sender certificate;
   forwarding a portion of the secure e-mail message to the recipient when decryption keys for the encryption scheme is unavailable to the server;
   receiving from a wireless device of the recipient, a request to re-scale the image attachments, and the request including a session key extracted from the forwarded secure e-mail message;
   decrypting the at least the one or more encrypted components of the secure e-mail message using the session key received from the recipient wireless device;
   determining whether the image attachments may be re-scaled based on a resource parameter which specifies one or more constraints of the wireless device;
   re-scaling in response to the determining image attachments to accommodate the one or more constraints of the wireless device;
   re-encrypting the re-scaled image attachments;
   marking the secure e-mail to indicate the re-encrypted re-scaled image attachments being modified and verified by the server; and
   sending the re-encrypted optimized one or more components re-scaled image attachment and the marked secure e-mail to the wireless device.

10. The method of claim 9 wherein the mark is generated prior to sending the re-scaled image attachment in the e-mail message to the wireless device.

11. The method of claim 10, wherein the marking is embedded in the header of the modified e-mail message.

12. The method of claim 10 wherein sending the rescaled image attachment further encrypts the re-scaled image attachment prior to sending it to the device.

13. The method of claim 9, wherein the resource parameter is selected from one or more resources of the wireless device selected from the group consisting of: a display resolution of the wireless device, a memory capacity of the wireless device, a wireless interface speed of the wireless device, and a processor speed of the wireless device.

14. The method of claim 9, wherein the resource parameter of the wireless device is determined from configuration data associated with the wireless device stored at the server or retrieved by the server.

15. The method of claim 9, wherein the secure e-mail message has an S/MIME signature and/or S/MIME encryption.

16. The method of claim 9, further comprising: storing the image attachment prior to re-scaling;
   receiving a request from the wireless device for the image attachment; and
   sending the image attachment to the wireless device.

17. A non-transitory computer readable memory containing instructions for e-mail message optimization, the instructions which when executed by a processor perform the method comprising:
   receiving from a sender a secure e-mail message directed to a recipient, the secure e-mail message including at least one or more encrypted components that are encrypted with an encryption scheme between the sender and the recipient;
   determining whether the encrypted components include image attachments to be re-scaled;
   if the encrypted components include image attachments to be re-scaled, verifying a signature of the sender by retrieving a sender certificate;
   forwarding a portion of the secure e-mail message to the recipient when decryption keys for the encryption scheme is unavailable to the server;
   receiving from a wireless device of the recipient, a request to re-scale the image attachments, and the request including a session key extracted from the forwarded secure e-mail message;
   decrypting the at least the one or more encrypted components of the secure e-mail message using the session key received from the recipient wireless device;
   determining whether the image attachments may be re-scaled based on a resource parameter which specifies one or more constraints of the wireless device;
   re-scaling in response to the determining the image attachments to accommodate the one or more constraints of the wireless device;
   re-encrypting the re-scaled image attachments:
   marking the secure e-mail to indicate the re-encrypted re-scaled image attachments being modified and verified by the server; and
   sending the re-encrypted re-scaled image attachments and marked secure e-mail to the wireless device.

18. The computer readable memory of claim 17, wherein the method performed by the instructions when executed by a processor, further comprises:
   storing the image attachment prior to re-scaling;
   receiving a request from the wireless device for the image attachment; and
   sending the image attachment to the wireless device.

19. A wireless device comprising: a memory containing instructions;
   a processor for executing the instructions contained in the memory, the instructions for performing:
   receiving from a sender a portion of an encrypted secure e-mail message forwarded from a server coupled to a wireless network, the secure e-mail message including at least one or more encrypted components that are encrypted with an encryption scheme between the sender and the recipient, decryption keys for the encryption scheme being unavailable to the server;

decrypting the received portion of the secure e-mail message;

determining if an image attachment is e- included in the encrypted components:

verifying a signature of a sender of the encrypted secure e-mail message if the encrypted components include image attachments;

sending a request to the server to re-scale the image attachment, the request including the session key used to encrypt the image attachment and extracted from the received portion of the encrypted secure e-mail message;

receiving from the server a marked secure e-mail by the server and a re-scaled image attachment that is re-scaled by the server based upon a resource parameter of the wireless device; and determining from the received marked secure e-mail that the received rescaled image attachment is verified by the server.

20. The wireless device of claim 19 wherein sending the session key further comprises sending an e-mail message identifier to the server.

21. The wireless device of claim 20 wherein sending the session key further comprising sending a portion identifier associated with a start of the image attachment of the encrypted secure e-mail message body.

22. The wireless device of claim 19 wherein the received re-scaled image attachment is marked as being re-scaled.

23. The wireless device of claim 19 wherein the received re-scaled image attachment is decrypted using a private key associated with the wireless device different from the sent session key.

24. The wireless device of claim 19 wherein the resource parameter is selected from one or more resources of the wireless device selected from the group consisting of: a display resolution of the wireless device, a memory capacity of the wireless device, a wireless interface speed of the wireless device, and a processor speed of the wireless device.

25. The wireless device of claim 19 wherein one or more of the resource parameters of the wireless device is sent from the wireless device to the server.

26. The wireless device of claim 19, wherein the secure e-mail message has an S/MIME signature and/or S/MIME encryption.

* * * * *

UNITED STATES PATENT AND TRADEMARK OFFICE
CERTIFICATE OF CORRECTION

| | | |
|---|---|---|
| PATENT NO. | : 9,584,451 B2 | Page 1 of 1 |
| APPLICATION NO. | : 13/454218 | |
| DATED | : February 28, 2017 | |
| INVENTOR(S) | : Neil Patrick Adams et al. | |

It is certified that error appears in the above-identified patent and that said Letters Patent is hereby corrected as shown below:

In the Claims

Column 8, Line 24, In Claim 1, please insert --,-- between the words "recipient" and "the secure".

Column 8, Line 49, In Claim 1, please change ":" to ";".

Column 10, Line 44, In Claim 17, please change ":" to ";".

Column 11, Line 3, In Claim 19, please delete "e-".

Column 11, Line 4, In Claim 19, please change ":" to ";".

Column 11, Line 17, In Claim 19, please replace "rescaled" with "re-scaled".

Signed and Sealed this
Second Day of May, 2017

Michelle K. Lee
*Director of the United States Patent and Trademark Office*